Oct. 31, 1961     D. J. GREENING ET AL     3,007,099
MOTOR CONTROL SYSTEMS Filed April 6, 1959     3 Sheets-Sheet 1

Inventors
Donald J. Greening
Norman L. Peterson
Charles E. Smith
By H R Rather
Attorney

Fig. 1b

# United States Patent Office 3,007,099
Patented Oct. 31, 1961

3,007,099
MOTOR CONTROL SYSTEMS
Donald J. Greening, Thiensville, Norman L. Peterson, Wauwatosa, and Charles E. Smith, Milwaukee, Wis., assignors to Cutler-Hammer, Inc., Milwaukee, Wis., a corporation of Delaware
Filed Apr. 6, 1959, Ser. No. 804,302
14 Claims. (Cl. 318—317)

This invention relates to motor control systems and more particularly to adjustable voltage systems for direct current motors.

While not limited thereto, the invention is especially applicable to direct current motor control with time limit acceleration and deceleration and field weakening control and for automatic regulation of the voltage or speed of the motor.

A general object of the invention is to provide an improved motor control system of the modular type.

A more specific object of the invention is to provide a plurality of component circuits or modules, each having input and output terminals and being readily connectable to one another and to external elements to afford a motor control system.

Another specific object of the invention is to provide component circuits or modules of the semi-conductor controlled type each adapted to be embedded in plastic material and having external terminals for connection in a motor control system.

Another object of the invention is to provide an improved motor control system employing semi-conductor devices.

A further object of the invention is to provide an improved adjustable voltage motor control system of the semi-conductor controlled type having time limit acceleration and deceleration, field weakening control and automatic regulation of the field excitation and of the armature voltage or speed of the motor.

Other objects and advantages of the invention will hereinafter appear.

While the apparatus hereinafter described is effectively adapted to fulfill the objects stated, it is to be understood that we do not intend to confine our invention to the particular preferred embodiments of motor control systems disclosed, inasmuch as they are susceptible of various modifications without departing from the scope of the appended claims.

The invention will now be described in detail with reference to the accompanying drawings, wherein.

Figure 1A:
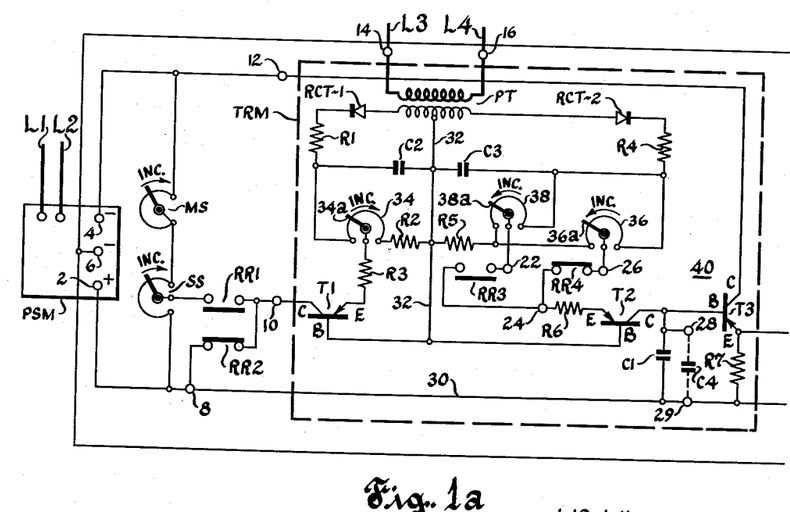
FIGURES 1A and 1B diagrammatically depict a motor control system constructed in accordance with the invention.
Figure 1B:
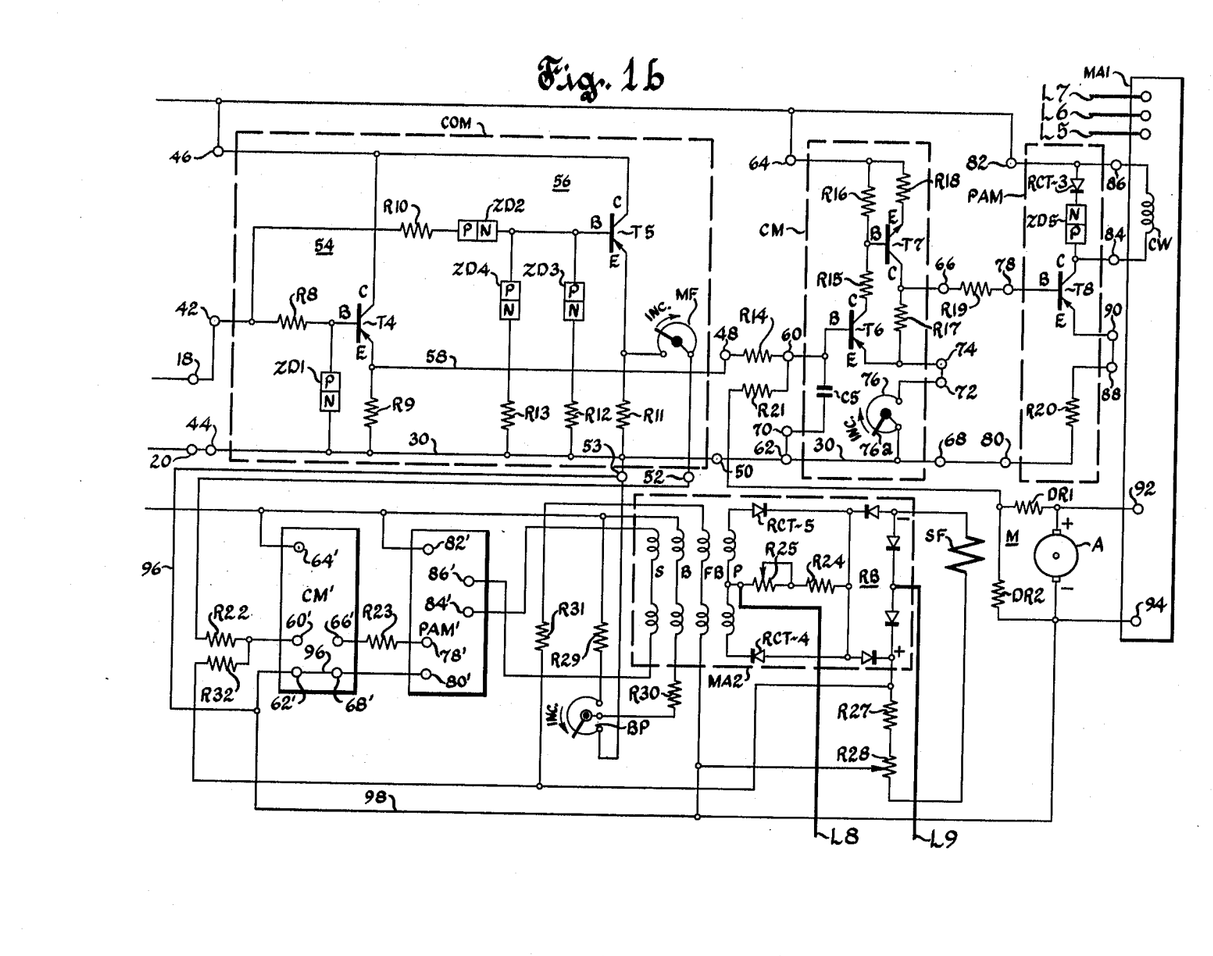

Referring to FIGS. 1A and 1B there is shown a modular control system for a motor M having an armature A and a shunt field winding SF. Armature A is supplied with adjustable unidirectional voltage from a rectifying magnetic amplifier MA1 and field winding SF is supplied with controllable unidirectional voltage from a rectifying magnetic amplifier MA2 as hereinafter more fully described to control the speed of the motor.

The control system for armature supply magnetic amplifier MA1 comprises a power supply module PSM, a timed reference module TRM, a cross-over module COM, a comparator module CM, a power amplifier module PAM and a voltage feedback circuit for regulating the armature voltage. The control system for field supply magnetic amplifier MA2 comprises the aforementioned power supply module PSM, timed reference module TRM and crossover module COM and additionally a comparator module CM', a power amplifier module PAM' and a voltage feedback circuit for regulating the field energization. Comparator module CM' and power amplifier module PAM' in the field control circuit are identical to comparator circuit CM and power amplifier circuit PAM, respectively, and therefore have been shown schematically to avoid complicating the drawings.

Power supply module PSM is connected through power supply lines L1 and L2 to a single-phase alternating current power supply source and is provided with a positive output terminal 2 and a pair of negative output terminals 4 and 6 for supplying two predetermined different values of unidirectional current output. Power supply module PSM is of a well-known rectifier bridge type and the details thereof have not been shown to avoid complicating the drawings. The rectified output from terminals 2 and 4 is preferably regulated and the rectified output from terminals 2 and 6 may be unregulated.

Timed reference module TRM is provided with external input terminals 8, 10, 12, 14 and 16, external output terminals 18 and 20, external terminals 22, 24 and 26 for connecting the timed reference circuit to interlocking run relay contacts RR3 and RR4 and external terminals 28 and 29 whereby capacitance may optionally be added to the storage circuit to increase the timing range of the system as hereinafter described. A speed setter potentiometer SS and a maximum speed rheostat MS are connected in series across terminals 2 and 4, the movable arm of rheostat MS being connected to the junction thereof with potentiometer SS. Direct current terminals 2 and 4 are also connected to input terminals 8 and 12, respectively, of timed reference module TRM. The movable arm of potentiometer SS is connected through normally open contacts RR1 of an interlocking run relay to input terminal 10 of timed reference module TRM and terminal 8 is connected to terminal 10 through normally closed contacts RR2 of the aforementioned relay. Input terminals 14 and 16 are connected through power supply lines L3 and L4 to a single phase alternating current power supply source.

Timed reference circuit TRM consists primarily of a pair of semi-conductor devices such as transistors of the P-N-P conductivity type or the like arranged in reverse order in serial relation with an energy storage device. To this end, there is provided a transistor T1 and a transistor T2 each having an emitter electrode E, a base electrode B and a collector electrode C. Input terminal 10 is connected to collector electrode C of transistor T1 and input terminal 8 is connected through common conductor 30 and capacitor C1 to collector electrode C of transistor T2. Base electrodes B of transistors T1 and T2 are connected directly to one another.

Control current for transistors T1 and T2 is obtained through a transformer PT having its primary winding connected to terminals 14 and 16 and therethrough and through lines L3 and L4 to the power supply source. The secondary winding of transformer PT is provided with a center tap which is connected through a conductor 32 to the junction of base electrodes B. The left-hand end of the secondary winding is connected through a half-wave rectifier RCT–1, a resistor R1, the resistor of an acceleration timing potentiometer 34 and a resistor R2 to conductor 32, the junction of resistor R1 and potentiometer 34 being connected through a filter capacitor C2 to conductor 32, to filter the rectified control current. Movable arm 34a of potentiometer 34 is connected through a resistor R3 to emitter electrode E of transistor T1. As a result, movement of arm 34a in the clockwise direction effects decrease in the emitter current in transistor T1 and consequently increases the acceleration time as indicated by the legend adjacent to the arrow.

The right-hand end of the secondary winding of transformer PT is similarly connected through a half-wave rectifier RCT-2, a resistor R4, the resistor of a stopping timing potentiometer 36 and a resistor R5 to conductor 32, the junction of resistor R4 and potentiometer 36 being connected through a filter capacitor C3 to conductor 32 to filter the rectified control current. Movable arm 36a of potentiometer 36 is connected through external terminal 26, normally closed contacts RR4, external terminal 24 and a resistor R6 to emitter E of transistor T2. As a result, movement of arm 36a in the counter-clockwise direction effects decrease in the emitter current of transistor T2 and consequently increases the stopping time as indicated by the legend adjacent to the arrow.

The resistor of a deceleration timing potentiometer 38 is connected across potentiometer 36 and movable arm 38a thereof is connected through external terminal 22, normally open contacts RR3, external terminal 24 and the aforementioned resistor R6 to emitter E of transistor T2. Movement of arm 38a in the counterclockwise direction effects decrease in the emitter current of transistor T2 and consequently increases the deceleration time as indicated by the legend adjacent to the arrow. External terminals 28 and 29 are provided so that an additional capacitor C4 shown in dotted lines may optionally be connected in parallel with capacitor C1 if it is desired to increase the timing range of the circuit.

The output voltage appearing across capacitor C1 (and capacitor C4 if used) is preferably applied through an amplifier 40 of one or more stages as desired to cross-over circuit COM in FIG. 1B. Amplifier 40 is provided with a semi-conductor device such as transistor T3 of the P-N-P conductivity type or the like having an emitter electrode E, a base electrode B and a collector electrode C. The junction of capacitor C1 and collector electrode C of transistor T2 is connected directly to base electrode B of transistor T3. The other, positive side of capacitor C1 is connected through a resistor R7 to emitter electrode E of transistor T3 and collector electrode C of the latter is connected through terminal 12 to negative terminal 4 of power supply circuit PSM. The output signal from timed reference circuit TRM is obtained from output terminal 20 connected to common positive conductor 30 and output terminal 18 connected to the junction of resistor R7 and emitter electrode E of transistor T3.

Cross-over module COM is provided with external input terminals 42, 44 and 46 and external output terminals 48, 50, 52 and 53. Output terminals 18 and 20 of timed reference circuit TRM are connected directly to input terminals 42 and 44, respectively, and input terminal 46 is connected directly to negative supply voltage output terminal 6 of power supply circuit PSM.

Cross-over circuit COM is provided with an armature reference voltage output portion 54 and a field reference voltage output portion 56. Motor armature reference voltage output portion 54 is provided with a semi-conductor device such as a transistor T4 of the P-N-P conductivity type or the like having an emitter electrode E, a base electrode B and a collector electrode C. Control voltage input terminal 42 is connected through a resistor R8 to base electrode B. Common reference potential input terminal 44 is connected through common conductor 30 and a resistor R9 to emitter electrode E and supply voltage input terminal 46 is connected directly to collector electrode C of transistor T4. Common conductor 30 is connected through a semi-conductor device such as a Zener diode ZD1 of the P-N conductivity type or the like to base electrode B of transistor T4. Emitter electrode E is connected through a conductor 58 to output terminal 48 and the other output terminal 50 for this portion of the cross-over circuit is connected directly to common conductor 30. Thus, the motor armature reference voltage output is obtained across resistor R9 which is connected in series with emitter electrode E of transistor T4.

Motor field reference voltage output portion 56 of the cross-over circuit is provided with a semi-conductor device T5 of the P-N-P conductivity type or the like having an emitter electrode E, a base electrode B and a collector electrode C. Input terminal 42 is connected through a resistor R10 and a semi-conductor device such as a Zener diode ZD2 (similar to diode ZD1) to base electrode B. Input terminal 44 is connected through common conductor 30 and a resistor R11 to emitter electrode E and collector electrode C is connected directly to supply voltage input terminal 46. Common conductor 30 is connected through a resistor R12 and a semi-conductor device such as a Zener diode ZD3 of the P-N conductivity type or the like in series to base electrode B of transistor T5. A resistor R13 and a Zener diode ZD4 are connected in parallel with resistor R12 and diode ZD3. Diodes ZD3 and ZD4 are preferably similar to diodes ZD1 and ZD2 except that they differ therefrom and from one another in their voltage response characteristics as hereinafter more fully described in connection with the description of operation of the system. Emitter electrode E of transistor T5 is connected through a minimum motor field adjusting rheostat MF to output terminal 52, the movable arm of rheostat MF being connected to the side thereof which is also connected to terminal 52. The other output terminal 53 for this portion of the cross-over circuit is connected to common conductor 30. Thus, the motor field reference voltage output is obtained across resistor R11 which is connected in series with emitter electrode E of transistor T5. As hereinafter more fully described, motor field energization is supplied from magnetic amplifier MA2 and the reference voltage obtained from cross-over circuit portion 56 is employed to control amplifier MA2 to weaken the motor field. Therefore, movement of the movable arm of rheostat MF clockwise in the direction of the arrow increases the minimum motor field energization by adding resistance to decrease the amount of field weakening that can be effected by adjustment of the reference voltage.

Comparator circuit CM is provided with external input terminals 60, 62 and 64, external output terminals 66 and 68 and external terminals 70 and 72 and 74 for reasons hereinafter described. Output terminal 48 of cross-over circuit COM is connected through a resistor R14 to input terminal 60 and common conductor 30 directly connects output terminal 50 to input terminal 62. Input terminal 64 of the comparator circuit is connected to negative terminal 6 of power supply module PSM.

Comparator circuit CM is provided with a semiconductor device such as a transistor T6 of the P-N-P conductivity type having an emitter electrode E, a base electrode B and a collector electrode C. Input terminal 60 is connected directly to base electrode B. Input terminal 62 is connected through common conductor 30, a gain adjusting rheostat 76 and serially jumpered external terminals 72 and 74 to emitter electrode E, movable arm 76a of rheostat 76 being connected to the side thereof which is connected to conductor 30. A filter capacitor C5 is connected between base electrode B and common conductor 30. Terminal 70 is provided between capacitor C5 and terminal 62 to afford disconnection of capacitor C5 by removing the jumper between terminals 62 and 70. Alternatively, additional filter capacitance may be added by connecting a capacitor of desired value in parallel with capacitor C5 between terminals 60 and 70. Collector electrode C of transistor T6 is connected through resistors R15 and R16 and input terminal 64 to negative supply terminal 6 of power supply circuit PSM.

Comparator circuit CM is provided with a second semi-conductor device such as a transistor T7 of the opposite or N-P-N conductivity type having an emitter electrode E, a base electrode B and a collector electrode C. The junction of resistors R15 and R16 is connected directly to base electrode B of transistor T7. The junction of emitter electrode E of transistor T6 and external terminal 74 is connected through a resistor R17 to collector electrode C of transistor T7 and emitter electrode E of the latter is connected through a resistor R18 to input terminal 64. The output from comparator circuit CM is obtained from common conductor 30 at output terminal 68 and output terminal 66 connected to the junction of resistor R17 and collector electrode C of transistor T7. External terminals 72 and 74 which are connected in series between rheostat 76 and the junction of emitter electrode E of transistor T6 and resistor R17 are provided to afford adjustment of the gain and stability of the comparator circuit. Thus, comparator gain may be decreased and stability increased by disconnecting the jumper between terminals 72 and 74 and adding the desired value of resistance between these terminals. Comparator gain may be increased and stability decreased by turning movable arm 76a of rheostat 76 clockwise in the direction of the arrow.

Power amplifier module PAM is provided with external input terminals 78, 80 and 82, external output terminals 84 and 86 and external terminals 88 and 90 for reasons hereinafter described. Output terminal 66 of comparator circuit CM is connected through a resistor R19 to input terminal 78 of power amplifier circuit PAM and input terminal 82 of the latter is directly connected to negative direct current supply terminal 6 of power supply module PSM.

Power amplifier circuit PAM is provided with a semi-conductor device such as a transistor T8 of the P-N-P conductivity type or the like having an emitter electrode E, a base electrode B and a collector electrode C. Input terminal 78 is connected directly to base electrode B, input terminal 80 is connected through a resistor R20 and serially jumpered terminals 88 and 90 to emitter electrode E of transistor T8 and collector electrode C of the latter is connected directly to output terminal 84. Input terminal 82 is connected directly to output terminal 86. A semi-conductor device such as a Zener diode ZD5 of the P-N conductivity type or the like and a blocking, protective, half-wave rectifier RCT-3 are connected in series across output terminals 84 and 86. The output from power amplifier circuit PAM is obtained across output terminals 84 and 86 and applied across control winding CW of magnetic amplifier MA1. External terminals 88 and 90 are provided to afford adjustment of the maximum output current of the power amplifier. To this end, the jumper between terminals 88 and 90 may be disconnected and the desired value of resistance connected in place thereof.

Magnetic amplifier MA1 is of a well-known construction and the details thereof have not been shown to avoid complicating the drawings. Magnetic amplifier MA1 is preferably supplied from a three-phase alternating current power supply source through power supply lines L5, L6 and L7. The rectified output of magnetic amplifier MA1 is applied from output terminals 92 and 94 across armature A of the motor. A voltage divider comprising serially connected resistors DR1 and DR2 is connected across armature A. A voltage regulating signal voltage is obtained from armature A and fed back to the input of comparator circuit CM. To this end, the junction of resistors DR1 and DR2 is connected through a resistor R21 to input terminal 60 of comparator circuit CM. The return path of this signal extends from common conductor 30 through terminal 53 and conductors 96 and 98 to the negative side of armature A.

Comparator module CM' is similar to circuit CM and the relevant terminals thereof have been given corresponding reference numerals distinguished by a prime. Output terminal 52 of the motor field reference voltage output portion of cross-over circuit COM is connected through a resistor R22 to input terminal 60' of comparator circuit CM'. The other output terminal 53 of this portion of the cross-over circuit is connected through common conductor 96 to input terminal 62', and input terminal 64' is connected directly to negative supply voltage terminal 6 of power supply module PSM. Output terminal 66' is connected through an external resistor R23 to input terminal 78' of power amplifier module PAM'. It will be apparent that power amplifier module PAM' is similar to circuit PAM and the relevant terminals thereof have been given corresponding reference numerals distinguished by a prime. Output terminal 68' of comparator module CM' is connected directly to input terminal 80' of power amplifier module PAM' and input terminal 82' of the latter is connected directly to negative supply voltage terminal 6 of power supply module PSM.

Magnetic amplifier MA2 is provided with a pair each of power windings P, feedback windings FB, bias windings B and control signal windings S. Power windings P are supplied from an alternating current power supply source through power supply lines L8 and L9 and a full-wave rectifier bridge RB. To this end, line L8 is connected to the junction of the power windings and line L9 is connected to one input terminal of rectifier bridge RB. The other input terminal of the rectifier bridge is connected to the power windings in three paths, one path extending from such input terminal through a self-saturating half-wave rectifier RCT-4 to the other end of the lower power winding, another path extending from such input terminal through a resistor R24 and an adjustable resistor R25 to the junction of the power windings and a third path extending from the other end of the upper power winding through a self-saturating half-wave rectifier RCT-5 to such input terminal of rectifier bridge RB. The positive output terminal of rectifier bridge RB is connected through resistors R27 and R28 and motor shunt field winding SF to the negative output terminal of the rectifier bridge.

A supply circuit for bias windings B extends from positive common conductor 30 through terminal 53, the resistor of bias adjusting potentiometer BP and a resistor R29 to negative supply terminal 6 of power supply module PSM. The movable arm of potentiometer BP is connected through a resistor R30 and bias windings B in series to negative supply terminal 6. The positive output terminal of rectifier bridge RB is connected through a resistor R31 and feedback windings FB in series to an adjustable center tap on resistor R28. Control windings S are connected in series across output terminals 84' and 86' of power amplifier module PAM'.

A feedback circuit also extends from the positive output terminal of rectifier bridge RB through a resistor R32 to input terminal 60' of comparator module CM' and the return path extends from common conductor 96 through conductor 98 to the adjustable center tap on resistor R28.

The operation of the system of FIGS. 1A and 1B will now be described. Let it be assumed that single phase alternating current power is connected through lines L1 and L2 to power supply circuit PSM, through lines L3 and L4 to timed reference circuit TRM and through lines L8 and L9 to field supply magnetic amplifier MA2. Let it also be assumed that three-phase alternating current power is connected through lines L5, L6 and L7 to magnetic amplifier MA1. Magnetic amplifier MA1 will be biased to its "off" condition so that an output voltage will not be applied to motor armature A until control winding CW thereof is energized as hereinafter described.

Connection of power to circuit PSM causes a unidirectional current flow from positive output terminal 2 thereof through the resistor of speed setter potentiometer SS and the movable arm and the upper portion of the resistor of maximum speed rheostat MS to negative output terminal 4. Unidirectional current also flows from positive output terminal 2 through common conductor 30, terminal 53, the resistor of potentiometer BP and resistor R29 to negative output terminal 6 of power supply circuit PSM. A voltage proportional to the voltage drop across resistor R29 and the voltage drop across an adjustable portion of the resistor of potentiometer BP is applied through the movable arm of the latter and resistor R30 across bias windings B of amplifier MA2 to bias the latter to its full "on" condition. As a result, current flows from line L3 through the upper power winding P, rectifier RCT-5 and in parallel with the aforementioned elements through resistors R25 and R24 and then through rectifier bridge RB and the positive output terminal thereof, resistors R27 and R28, field winding SF and rectifier bridge RB to line L9. The circuit for each alternate half-cycle of the alternating current source may be traced from line L9 through rectifier bridge RB, resistors R27 and R28, field winding SF, rectifier bridge RB, rectifier RCT-4 and the lower power winding P and in parallel with the latter two elements through resistors R24 and R25 to line L8. Thus, unidirectional current is supplied to motor shunt field winding SF to afford full field excitation. It will be apparent that current flows in shunt of power windings P through resistors R24 and R25 to afford minimum motor field excitation regardless of whether magnetic amplifier MA2 is biased "on." The minimum field excitation may be adjusted by adjusting the movable tap on resistor R25. The voltage drop across resistor R27 and the upper portion of resistor R28 is applied through resistor R31 across feedback windings FB to afford a predetermined amount of negative feedback tending to turn the amplifier a small amount toward its off condition. The effect of this feedback is to compensate for line voltage fluctuations and for variations in amplifier output due to resistance changes caused by heating and the like thereby to linearize the amplifier output and to maintain the motor field excitation constant at the preselected value.

The alternating current power connection through lines L3 and L4 to input terminals 14 and 16 of timed reference circuit TRM energizes the primary winding of transformer PT. As a result, half-wave rectified current flows from the left-hand end of the secondary winding of transformer PT through rectifier RCT-1, resistor R1, the resistor of acceleration timing potentiometer 34, resistor R2 and conductor 32 to the center tap of the secondary winding. An adjustable portion of the voltage drop across potentiometer 34 and resistor R2 is applied from movable arm 34a through resistor R3 and conductor 32 across emitter electrode E and base electrode B of transistor T1.

Similarly, half-wave rectified current flows during each alternate half-cycle from the right-hand end of the secondary winding of transformer PT through rectifier RCT-2, resistor R4, the resistor of stopping timing potentiometer 36, resistor R5 and conductor 32 to the center tap of the secondary winding. An adjustable portion of the voltage drop across potentiometer 36 and resistor R5 is applied from movable arm 36a through contacts RR4, resistor R6 and conductor 32 across emitter electrode E and base electrode B of transistor T2.

To initiate operation of the system, run relay contacts RR1 and RR3 are closed and run relay contacts RR2 and RR4 are opened. Contacts RR1 connect the negative voltage from the movable arm of potentiometer SS through input terminal 10 to collector electrode C of transistor T1. Contacts RR2 disconnect the collector electrode of transistor T1 from positive terminal 8. Contacts RR4 disconnect movable arm 36a of stopping timing potentiometer 36 from transistor T2 and contacts RR3 connect movable arm 38a of deceleration timing potentiometer 38 through resistor R6 to emitter electrode E of transistor T2. Emitter to base voltage having been applied to transistor T1, the latter is rendered operative to pass constant current as determined by the setting of movable arm 34a of potentiometer 34. Thus, constant current flows from input terminal 8 through common conductor 30, storage capacitor C1, transistor T2 in the reverse direction, resistor R2, the right-hand portion of the resistor of potentiometer 34 and arm 34a, resistor R3, emitter and collector electrodes of transistor T1 and contacts RR1 to the movable arm of speed setter potentiometer SS. Capacitor C1 charges in response to the aforementioned constant current flow therethrough and the voltage across the capacitor increases linearly.

Timed reference circuit TRM utilizes two significant transistor characteristics; (1) for normal polarity connections, the collector current is a function of the emitter current and is essentially independent of collector voltage, and (2) the transistor functions substantially as a short circuit to currents opposite to the normal polarity connections. Therefore, when the input voltage is higher than the output voltage, a current will flow from the input source to charge capacitor C1. This current will flow through transistor T2 as if it were a short circuit and will charge capacitor C1 until the output voltage equals the input voltage. Since the magnitude of this current is essentially solely a function of the emitter current of transistor T1 and the latter current is constant for any given setting of potentiometer 34, the voltage across capacitor C1 will increase as a linear function of time.

If the input voltage is decreased by resetting speed setter potentiometer SS so that the output voltage has a higher value than the input voltage, the output voltage will decrease as a linear function of time until the output voltage equals the input voltage. Thus, capacitor C1 discharges through transistor T1 as if it were a short circuit. The magnitude of this current is essentially solely a function of the emitter current of transistor T2 and since the latter current is constant for any given setting of potentiometer 38, the voltage across capacitor C1 will decrease as a linear function of time.

External terminals 28 and 29 are provided so that the timing range of timed reference circuit TRM may be increased as desired by connection of an additional capacitor C4 in parallel with capacitor C1. The output voltage appearing across capacitor C1 (and capacitor C4 if used) is applied through an amplifier 40 of one or more stages as desired to the input terminals of cross-over module COM. Thus, the voltage across capacitor C1 is applied across the emitter and base electrodes of amplifier transistor T3. This effects flow of current from conductor 30 through resistor R7, emitter E and collector C of transistor T3 to negative terminal 4 of power supply circuit PSM. The voltage drop across resistor R7 is applied to output terminals 18 and 20 of the timed reference circuit and therethrough to input terminals 42 and 44 of cross-over circuit COM. The value of resistor R7 is selected so that the voltage at output terminal 18 may be varied linearly from its maximum negative value all the way to the value of voltage at output terminal 20.

The input voltage to cross-over circuit COM is applied across the emitter and base electrodes of transistor T4 in a circuit extending through common conductor 30, resistor R9, emitter E and base B and resistor R8 to input terminal 42. This input voltage is also applied through common conductor 30 and resistor R8 across Zener diode ZD1 in the reverse direction. As a result of the positive bias voltage applied to the emitter of transistor T4, the latter is rendered conducting in a circuit extending from common conductor 30 through resistor R9, emitter E and collector C and terminal 46 to negative supply voltage terminal 6 of power supply module PSM. The voltage drop across resistor R9 which corresponds to the output voltage of transistor T4 is applied through conductors 58 and 30 to output terminals 48 and 50 and therethrough and through resistor R14 to input terminals 60 and 62 of comparator circuit CM.

The input voltage to comparator circut CM is filtered by capacitor C5 and applied across the emitter and base electrodes of transistor T6 to render the latter conducting. As a result, current flows from input terminal 62 through common conductor 30, arm 76a and the upper portion of the resistor of rheostat 76, serially-jumpered terminals 72 and 74, emitter E and collector C of transistor T6, resistors R15 and R16 and terminal 64 to negative terminal 6 of power supply circuit PSM. The voltage drop across resistor R16 is applied through resistor R18 across the emitter and base electrodes of transistor T7 to afford negative emitter bias voltage to render the latter conducting. As a result, current also flows from common conductor 30 through arm 76a and the upper portion of the resistor of rheostat 76, terminals 72 and 74, resistor R17, collector C and emitter E of transistor T7, resistor R18 and terminal 64 to negative terminal 6 of power supply circuit PSM.

Transistors T6 and T7 are of opposite conducting types to afford connection thereof in the circuit shown thereby to permit use of a common conductor 30 extending through the control system and to afford temperature compensation. In the event the current through transistor T7 increases, for example, due to ambient temperature changes, the voltage drop across rheostat 76 correspondingly increases. This causes the positive bias voltage at emitter E of transistor T6 to become less positive. This decreases the conduction through transistor T6 and the voltage drop across resistor R16. The resultant decrease in the negative bias voltage at emitter E of transistor T7 readjusts the output voltage of the comparator circuit. If the current through transistor T6 increases due to ambient temperature changes, the negative emitter bias voltage of transistor T7 is increased. The voltage drop across rheostat 76 correspondingly increases and the emitter of transistor T6 becomes less positive to effect compenation. As a result, the output of comparator circuit CM is automatically stabilized to a value determined by the reference voltage and the setting of movable arm 76a of rheostat 76 and is regulated by feedback so that it will not vary in response to temperature changes.

The output of the comparator circuit corresponding to the voltage drop across rheostat 76 and resistor R17 is applied to output terminals 66 and 68 and therethrough and through resistor R19 to input terminals 78 and 80 of power amplifier circuit PAM. This output of comparator circuit CM is applied from input terminals 78 and 80 across the emitter and base electrodes of transistor T8, to render the latter conducting. This effects current flow from input terminal 80 through resistor R20, terminals 88 and 90, emitter E and collector C of transistor T8, output terminal 84, control winding CW of magnetic amplifier MA1, output terminal 86 and input terminal 82 to negative terminal 6 of power supply circuit PSM. Rectifier RCT-3 blocks current flow in shunt of winding CW.

As a result of energization of control winding CW, magnetic amplifier MA1 becomes partially conducting and supplies output voltage from terminals 92 and 94 thereof to armature A of motor M. Shunt field winding SF having been energized as hereinbefore described, the output of magnetic amplifier MA1 causes operation of the motor.

A feedback voltage proportional to the supply voltage to the motor armature circuit is applied from the junction of resistors DR1 and DR2 through resistor R21 to input terminal 60 of comparator circuit CM. It will be apparent that this feedback voltage has opposite polarity relative to the reference voltage applied from cross-over circuit COM to input terminal 60. Thus, a voltage proportional to any variation in the armature voltage is fed back and compared with the armature reference voltage and the resultant voltage is applied through comparator circuit CM and power amplifier circuit PAM to control magnetic amplifier MA1. This effects regulation of the armature voltage to a preselected value.

The magnitude of the output voltage applied to armature A of the motor may be increased by turning speed setter potentiometer SS clockwise in the direction of the arrow and decreased by turning the same in the opposite direction. This causes corresponding increase or decrease in the motor speed.

When speed setter potentiometer SS is turned in the clockwise direction to accelerate the motor, cross-over circuit COM functions to control increase of the motor armature voltage to its rated value and then functions to control motor shunt field weakening to further accelerate the motor. As the reference voltage applied to input terminals 42 and 44 of cross-over circuit CM is increased, the output voltage at terminals 48 and 50 increases in proportion thereto until the applied armature voltage reaches rated value and the motor accelerates under armature voltage control with full field excitation. During this time, the voltage at output terminals 52 and 53 of the cross-over circuit remains substantially at zero value. This is for the reason that substantially all of the voltage drop occurs across high impedance diode ZD2 to maintain transistor T5 non-conducting. Further increase in the value of speed reference voltage causes Zener diodes ZD1 and ZD2 to respond to effect current flow therethrough in the reverse direction. Diode ZD1 acts as a constant voltage device and maintains the armature reference voltage at output terminals 48 and 50 constant with further increase in speed reference voltage at input terminals 42 and 44. Consequently the armature voltage of the motor is maintained at the rated value.

When Zener diode ZD2 responds at rated armature voltage, a positive emitter bias voltage is applied to transistor T5 in a circuit extending from common conductor 30 through resistor R11, emitter E and base B of transistor T5, diode ZD2 in the reverse direction and resistor R10 to input terminal 42 to render transistor T5 conducting. This effects current flow from common conductor 30 through resistor R11, emitter E and collector C of transistor T5 and terminal 46 to negative terminal 6 of power supply circuit PSM. The voltage drop across resistor R11 which corresponds to the output voltage of motor field reference voltage output portion 56 of the cross-over circuit is applied through minimum motor field rheostat MF to output terminals 52 and 53 and therethrough and through resistor R22 and conductor 96 to input terminals 60' and 62' of comparator circuit CM'. A motor field regulating feedback voltage corresponding to the voltage drop across resistor R27 and the upper portion of resistor R28 in the shunt field circuit is applied through resistor R32 and conductor 98 to input terminals 60' and 62' of comparator circuit CM'. It will be apparent that this feedback voltage is of opposite polarity relative to the field reference voltage derived from cross-over circuit COM and serves to maintain the field excitation constant at the selected value. The reference and feedback voltages are compared and the resultant voltage is amplified and applied from the output terminals of comparator circuit CM' through resistor R23 to input terminals 78' and 80' of power amplifier circuit PAM'. The amplified voltage is applied from output terminals 84' and 86' across signal control windings S of magnetic amplifier MA2. Energization of signal control windings S turns the amplifier toward its "off" condition thereby to weaken the shunt field energization and accelerate the motor under field weakening control.

The maximum voltage obtainable by adjustment of speed setter potentiometer SS is determined and adjusted by setting the movable arm of maximum speed rheostat MS. Turning the movable arm of the latter all the way clockwise in the direction of the arrow shunts the resistance of rheostat MS effectively out of circuit so that the maximum speed reference voltage applicable to the timed reference circuit is substantially equal to the voltage derived from output terminals 2 and 4 of power supply circuit PSM. The minimum motor field energization obtainable by adjustment of speed setter potentiometer SS is determined and adjusted at rheostat MF. Turning the movable arm of rheostat MF clockwise in the direction of the arrow increases the minimum motor field energization and turning the movable arm in the opposite direction decreases the same.

Figure 4:
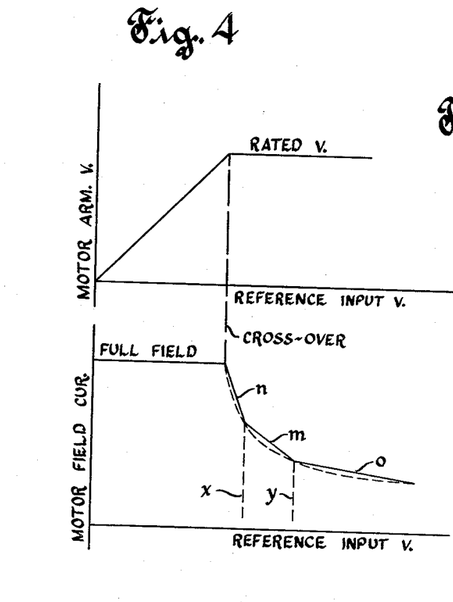
FIG. 4 graphically shows the operating characteristics of a portion of the system of FIGS. 1A and 1B.

FIG. 4 graphically shows the motor armature and shunt field characteristics which are required to afford linear speed adjustment by control of the armature voltage and field energization. As shown in the upper portion of FIG. 4, wherein armature voltage is plotted against reference input voltage, linear speed control requires adjustment of the armature voltage linearly to rated value. While the armature voltage is adjusted, the field energization must be maintained constant at full value as shown in the lower portion of FIG. 4, wherein motor field current is plotted against reference input voltage. For further linear acceleration of the motor, the armature voltage must be maintained constant at rated value and the field energization must be decreased non-linearly in accordance with the motor shunt field current-speed characteristic curve which is non-linear due to the inherent characteristics of the motor as shown by the broken curve in the lower portion of FIG. 4.

As the motor speed varies non-linearly relative to the field current, it is necessary to adjust the field current non-linearly in order to afford a linear variation in speed relative to the reference input voltage to the cross-over circuit. The known relation of the speed of the motor to the value of field current is such that acceleration in uniform incremental steps requires adjustment of the field current in progressively smaller decremental steps. In order to afford such non-linear adjustment of the field current, it is necessary to provide a reference output voltage which increases relative to the reference input voltage beyond the cross-over point as the field current decreases relative to the speed of the motor and vice versa. Such non-linear reference output voltage can then be employed to control the field supply magnetic amplifier and to weaken the field energization to afford a change in motor speed which is proportional to a change in reference input voltage.

As hereinbefore described, the output voltage at terminals 48 and 50 of cross-over circuit COM and, consequently, the motor armature voltage controlled thereby increases linearly in response to increase in the reference input voltage through a first range of magnitude of the latter. When the output voltage at terminals 48 and 50 reaches a predetermined value proportional to the rated armature voltage as shown in the upper portion of FIG. 2, cross-over takes place. That is, further increase in reference input voltage causes the output voltage at terminals 48 and 50 and, consequently the armature voltage to remain constant at rated value; and an output voltage at terminals 52 and 53 which causes field weakening is initiated. While the output voltage at terminals 48 and 50 is increased, the output voltage at terminals 52 and 53 is maintained substantially at zero value. As a result, the field current controlled thereby is maintained constant at full value as shown by the horizontal portion of the curve in the lower portion of FIG. 4.

When the reference input voltage is increased beyond the cross-over point, the output voltage at terminals 52 and 53 increases at a first relatively rapid rate of change to cause a proportional decrease in the field current in accordance with curve $n$ in the lower portion of FIG. 4 until the reference input voltage reaches value $x$. At this point, Zener diode ZD3 responds to permit current flow in shunt of the emitter and base electrodes of transistor T5. This shunt current is limited by resistor R12 so that further increase in the reference input voltage causes the output voltage at terminals 52 and 53 to increase at a relatively slower rate of change to cause a proportional decrease in the field current in accordance with curve $m$ until the reference input voltage reaches value $y$. Thus, the response of diode ZD3 at point $x$ causes a decrease in the rate of change of output voltage relative to the input voltage.

At point $y$, Zener diode ZD4 responds to establish another conducting circuit in shunt of the emitter and base electrodes of transistor T5. This latter shunt current is limited by resistor R13 so that further increase in reference input voltage causes the output voltage at terminals 52 and 53 to increase at a relatively still slower rate of change to cause a proportional decrease in the field current in accordance with curve $o$. Thus, the response of diode ZD4 at point $y$ causes a further decrease in the rate of change of output voltage relative to the input voltage.

While the output voltage at terminals 52 and 53 has two abrupt alterations in its rate of change relative to the input voltage at points $x$ and $y$, it will be apparent that points $x$ and $y$ and the successive rates of change of the output voltage are selected so that the actual output voltage characteristic very nearly corresponds to or approximates the desired output voltage characteristic. As a result, the actual field weakening characteristic $n$–$m$–$o$ in the lower portion of FIG. 4 very nearly corresponds to or approximates the desired field weakening characteristic shown by the broken curve. Therefore, it is seen that a linear change in the magnitude of the reference input voltage applied to terminals 42 and 44 of cross-over circuit COM in the armature control range affords a proportional change in the motor speed. Also, a linear change in the magnitude of the reference input voltage in the field control range affords a linear change in the motor speed in proportion thereto.

To afford the aforementioned linear speed control, portion 56 of the cross-over circuit renders the motor speed proportional to the reference input voltage in the field weakening range of the latter.

Since $$N = \frac{1 + K_1 \cdot I_f}{K_2 \cdot I_f}$$

or $$I_f = \frac{1}{K_2 \cdot N - K_1}$$

where $N$=motor speed; $I_f$=field current; $K_1$=the slope of the saturation curve below full field saturation when field flux is plotted against field current or, in other words, the ratio of an increment of field flux to a corresponding increment of field current below the saturation point of the field; and $K_2$=maximum field of flux.

Then if Vin (reference input voltage) is proportional to N and Vout (reference output voltage) is proportional to $I_o - I_f$ or equal to $K(I_o - I_f)$ where $I_o$=full field current; and K is a constant for changing current to voltage;

$$V\text{out} = KI_o - \frac{K}{K_2 \cdot N - K_1}$$

And since N is proportional to Vin, then $$V\text{out} = KI_o - \frac{K}{K_2 \cdot V\text{in} - K_1}$$

It will be apparent that the latter two empirical equations determine what the output voltage characteristics of portion 56 of the cross-over circuit should be to afford linear speed control of a given shunt motor.

While two Zener diodes ZD3 and ZD4 have been shown for illustrative purposes, it will be apparent that a greater number may be employed if desired to afford field weakening more nearly in accordance with the field current-speed characteristic curve.

To stop the motor, speed setter potentiometer SS may be turned all the way counterclockwise to decrease the reference voltage to zero or contacts RR1 and RR3 are opened and contacts RR2 and RR4 are closed. Contacts RR1 disconnect the movable arm of potentiometer SS and thus the adjustable input voltage from input terminal 10 of the timed reference circuit and contacts RR3 disconnect deceleration timing potentiometer 38 from the emitter electrode of transistor T2. Contacts RR2 complete a discharge circuit for capacitor C1 and contacts RR4 connect arm 36a of stopping timing potentiometer 36 to the emitter electrode of transistor T2. As a result, capacitor C1 discharges in a circuit extending through common conductor 30, terminal 8, contacts RR2, terminal 10, transistor T1 in the reverse direction, resistor R5, the left-hand portion of the resistor of potentiometer 36 and arm 36a, contacts RR4, resistor R6 and the emitter and collector electrodes of transistor T1 to capacitor C1. The value of the discharge current is constant for any given setting of potentiometer 36. The stopping time may be increased by turning arm 36a counterclockwise in the direction of the arrow to decrease the value of discharge current. Conversely, the stopping time may be decreased by turning arm 36a in the clockwise direction to increase the value of discharge current.

Transistor T8 of power amplifier circuit PAM is protected from the inductive effect of control winding CW. It will be apparent that when the motor is accelerated or running, the output current of the power amplifier flows through control winding CW and that rectifier RCT–3 blocks current flow through the shunt circuit. However, when the motor is decelerated or stopped, the shunt circuit provides a low impedance discharge path to prevent damage to or destruction of transistor T8. Thus, current caused to flow by the inductive countervoltage of winding CW in response to collapse of its magnetic field flows through terminal 86, rectifier RCT–3, diode ZD5 and terminal 84. Diode ZD5 is of the Zener type and responds to a voltage of predetermined value to effect an avalanche of current flow therethrough to protect transistor T8.

Figure 2:
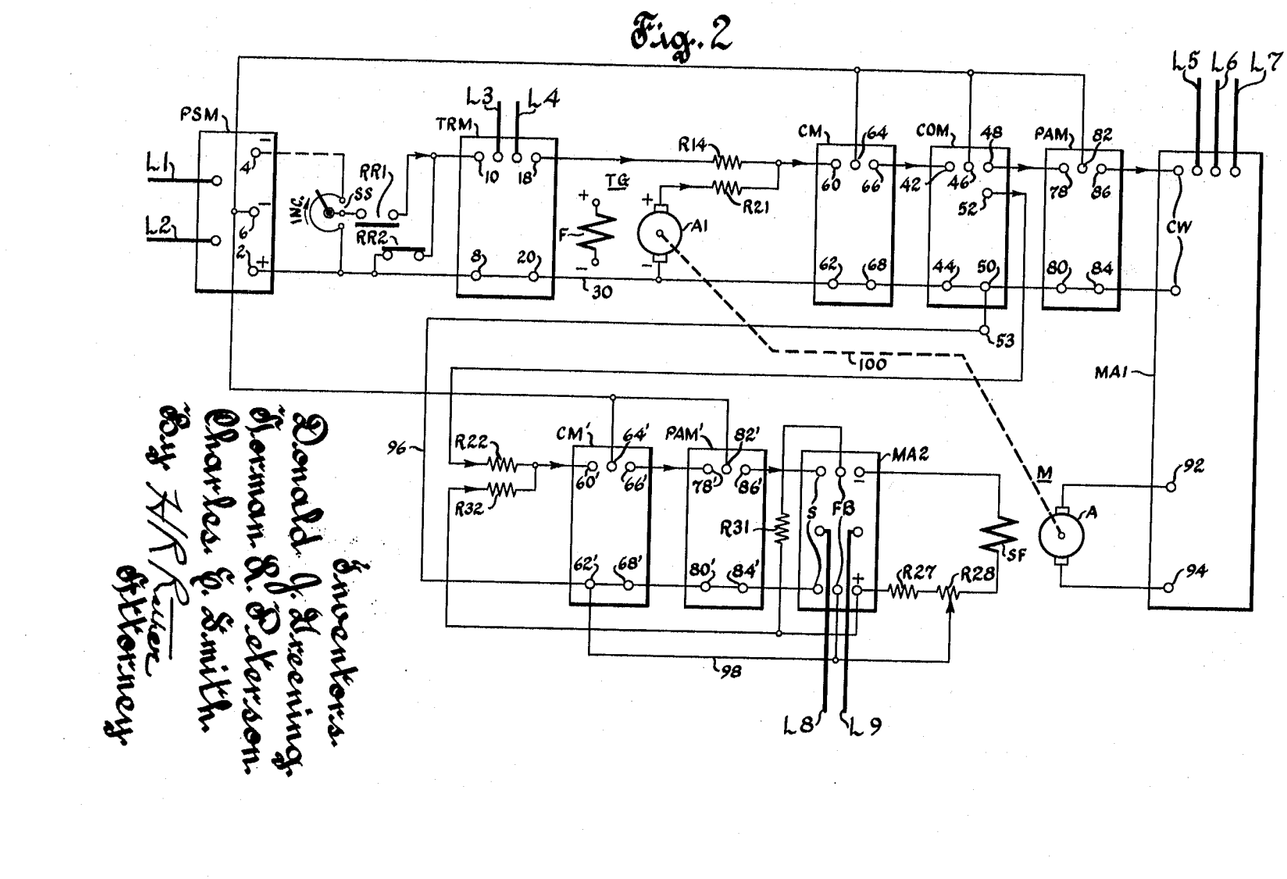
FIG. 2 is a schematic diagram of a modified motor control system providing speed regulation.

Referring to FIG. 2, there is shown a modification of the system of FIGS. 1A and 1B. In FIG. 2, reference characters similar to those of FIGS. 1A and 1B have been employed for like elements and the modular circuits which are similar to those of FIGS. 1A and 1B have been shown schematically. The system of FIG. 2 differs in that speed regulation is employed in place of the motor armature voltage regulation shown in FIG. 1B. As the speed regulating voltage derived from the tachometer generator must be capable of controlling not only the armature voltage but also the shunt field excitation, comparator circuit CM has been connected ahead of cross-over circuit COM to provide therefor.

In FIG. 2, magnetic amplifier MA1 supplies voltage to armature A of direct current motor M and magnetic amplifier MA2 controls energization of shunt field winding SF. The control system for amplifier MA1 comprises a power supply module PSM, a timed reference module TRM, a comparator module CM, a cross-over module COM and a power amplifier module PAM. The control system for amplifier MA2 comprises the aforementioned power supply module PSM, timed reference module TRM, comparator module CM and cross-over module COM and, in addition thereto, a comparator module CM' and a power amplifier module PAM'.

Power supply module PSM is energized from a single-phase alternating current power supply source through power supply lines L1 and L2 and output terminals 2 and 6 are connected to supply comparator circuits CM CM', cross-over circuit COM and power amplifier circuits PAM and PAM'. While terminals 2 and 6 also supply the bias winding of magnetic amplifier MA2 as shown in FIGS. 1A and 1B, this bias winding has been omitted in FIG. 2 to avoid complicating the drawing. The maximum speed rheostat has not been shown as indicated by the broken line between potentiometer SS and terminal 4.

Timed reference circuit TRM is energized through lines L3 and L4 and magnetic amplifier MA2 is energized through lines L8 and L9 from a single-phase alternating current power supply source. Magnetic amplifier MA1 is energized through lines L5, L6 and L7 from a three-phase alternating current power supply source.

To start the motor, the aforementioned run relay is energized to close contacts RR1 and open contacts RR2 and speed setter potentiometer SS is turned clockwise in the direction of the arrow. This effects operation of timed reference circuit TRM to apply a linearly increasing reference voltage through resistor R14 to input terminals 60 and 62 of comparator circuit CM and through the latter to input terminals 42 and 44 of cross-over circuit COM. As a result, the latter operates to apply the motor armature reference voltage from output terminals 48 and 50 through power amplifier circuit PAM to control winding terminals CW of magnetic amplifier MA1. A rectified output voltage is applied from output terminals 92 and 94 of magnetic amplifier MA1 under the control of its control winding across armature A of the motor. Magnetic amplifier MA2 is normally biased to its full "on" condition as hereinbefore described so that the motor starts when armature voltage is applied. The feedback windings of magnetic amplifier MA2 are energized in a circuit extending from the positive output terminal of the amplifier through resistor R31, feedback winding terminals FB to the adjustable tap on resistor R28 thereby to supply feedback in accordance with the voltage drop across resistor R27 and the left-hand portion of resistor R28.

When the motor is accelerated by turning potentiometer SS, cross-over circuit COM operates to control increase of the armature voltage to rated value whereafter the armature voltage remains at this value and field weakening is initiated as hereinafter described. The field reference voltage is applied from output terminals 52 and 53 of cross-over circuit COM through resistor R22 and conductor 96 to input terminals 60' and 62' of comparator circuit CM'. A feedback voltage is applied from the positive output terminal of amplifier MA2 through resistor R32 to input terminal 60', the return path for this voltage extending from input terminal 62' through conductor 98 to the tap on resistor R28. The field reference and feedback voltages are compared and applied through power amplifier circuit PAM' to signal control winding terminals S of magnetic amplifier MA2 to turn the latter toward its "off" condition thereby to weaken the motor shunt field SF energization and to accelerate the motor.

Motor speed regulation is afforded by a tachometer generator TG having an armature A1 and a field winding F, the latter being energized from a suitable constant unidirectional source as indicated by the positive and negative symbols. The positive side of armature A1 of tachometer generator TG is connected through resistor R21 to input terminal 60 of comparator circuit CM and the negative side thereof is connected to common conductor 30. Armature A1 is driven through a shaft 100 by armature A of the motor. As a result, tachometer generator TG provides an output voltage which is proportional to motor speed. This voltage is applied through resistor R21 to input terminal 60 of comparator circuit CM and compared in the latter with the reference voltage derived from timed reference circuit TRM. The resultant voltage is applied from comparator circuit CM to crossover circuit COM and then through power amplifier circuit PAM to control winding CW of magnetic amplifier MA1 which in turn controls the motor armature voltage or through comparator circuit CM' and power amplifier circuit PAM' to signal control windings S of magnetic amplifier MA2 which in turn controls field weakening. It will be apparent that this speed regulating voltage generated by tachometer generator TG has opposite polarity relative to the reference voltage derived from timed reference circuit TRM. Thus, a voltage proportional to any variation in motor speed is compared with the reference voltage to regulate the speed of the motor.

It will be apparent that in the modification shown in FIG. 2, comparator circuit CM has been connected ahead of crossover circuit COM to afford speed regulation throughout the range of motor speed. When the motor is running in the range of speed from zero to full armature voltage with full field energization, the voltage from tachometer generator TG is applied to the crossover circuit to control the motor armature voltage thereby to regulate the speed of the motor. Also, when the motor is running in the range of higher speed under field weakening with the armature voltage constant at full value, the voltage from tachometer generator TG is applied to the cross-over circuit to control the field energization thereby to regulate the speed of the motor. More specifically, in the first mentioned speed range, an increase in motor speed causes an increase in tachometer generator voltage to decrease the resultant voltage. This reduces the applied armature voltage to readjust the motor speed to the selected value. In the second mentioned speed range, an increase in motor speed causes an increase in tachometer generator voltage to decrease the resultant voltage. As the resultant voltage normally turns field control magnetic amplifier MA2 toward its "off" condition, such decrease in the resultant voltage turns the magnetic amplifier toward its "on" condition to strengthen the motor field thereby to readjust the motor speed to the selected value.

Figure 3:
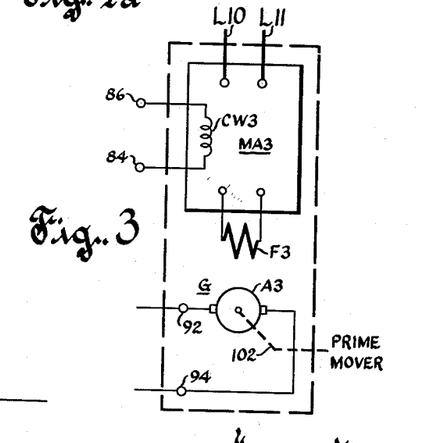
FIG. 3 shows another modification which may be substituted for the magnetic amplifier in the right-hand portion of either FIG. 1B or FIG. 2 to afford an adjustable voltage generator for motor control.

Referring to FIG. 3, there is shown an alternative adjustable-voltage motor armature voltage source which may be substituted in place of magnetic amplifier MA1 in FIG. 1B or in FIG. 2. As shown in FIG. 3, a magnetic amplifier MA3 of known type is supplied through lines L10 and L11 from a single-phase alternating current power supply source. Magnetic amplifier MA3 is provided with a control winding CW3 which is energized from output terminals 84 and 86 of power amplifier circuit PAM. The rectified output of magnetic amplifier MA3 is connected across field winding F3 of a direct current generator G. Armature A3 of generator G is mechanically driven through shaft 102 by a prime mover such as an alternating current motor or the like. Armature A3 of the generator is connected to terminals 92 and 94 and therethrough across armature A of the motor. With these connections, the generator supplies the motor armature voltage and the value thereof may be adjustably controlled by varying the generator field excitation in accordance with the reference voltage.

It will be apparent that the systems hereinbefore described are extremely simple in construction and efficient in operation. The systems are constructed of modular component circuits with a minimum of external control elements which may readily be connected to the external terminals provided. Only those elements which may be varied in value depending upon the particular application of the system are connected externally of the modules. The novel modular circuits devised are adapted for potting in plastic material because only long lasting elements are employed therein which do not require replacement over long periods of operational use. The motor speed may be adjusted as desired and the timed rates of acceleration and deceleration and stopping of the motor may be individually selected as desired. As constant currents are employed to charge and discharge the storage capacitor, the system affords linear control of the motor armature voltage all the way to zero voltage difference between the input voltage to the timed reference circuit and the voltage across the storage capacitor. Also, linear acceleration and deceleration under field control is afforded as the cross-over circuit provides a field reference voltage which may be varied non-linearly substantially in accordance with the inherent field speed-current characteristic curve. The comparator circuit provides automatic temperature compensation and the power amplifier circuit protects its transistor from the inductive load. The system can readily be arranged for either armature voltage or speed regulation, the latter being effective also under field weakening speed control. Also, feedback regulation is afforded to maintain constant field excitation at the selected value.

We claim:

1. In an adjustable voltage drive, the combination with a direct current motor having an armature winding and a shunt field winding, of first means for energizing said field winding to full value and controllable to decrease said field winding energization, second means controllable to supply adjustable voltage to said armature winding, means providing a source of constant but adjustable first control voltage, means for providing a second control voltage which changes in magnitude linearly at a timed rate in response to change in magnitude of said first control voltage, and a cross-over network comprising first semi-conductor control means responsive through a first range of magnitude of said second control voltage for providing an armature control voltage for controlling said second means to supply adjustable voltage to said armature winding thereby to effect operation of and acceleration of the motor, and second semi-conductor control means responsive through a second range of magnitude of said second control voltage for maintaining said armature voltage at full value and for providing a field control voltage which varies non-linearly substantially in accordance with the inherent field current-speed characteristic for controlling said first means to decrease the energization of said field winding non-linearly thereby linearly to further accelerate the motor.

2. In an adjustable voltage drive, the combination with a direct current motor having an armature winding and a shunt field winding, of first means for energizing said field winding to full value and operable to control said field winding energization, second means controllable to supply adjustable voltage to said armature winding, means providing a source of constant but adjustable first control voltage, means for providing a second control voltage which changes in magnitude at a timed rate in response to change in magnitude of said first control voltage, means responsive to operation of the motor for providing a third control voltage varying in accordance with the instantaneous value of an operating condition of the motor armature, means responsive to said second and third control voltages for providing a fourth control voltage which varies in accordance with the resultant of said second and third control voltages, means responsive to said fourth control voltage for controlling said second means to supply adjustable voltage to said armature winding thereby to effect operation and acceleration of the motor, and a cross-over network comprising first semi-conductor control means effective through a first range of magnitude of said second control voltage for providing adjustable control of said armature voltage while said field energization is maintained constant, said crossover network comprising second semi-conductor control means effective through a second range of magnitude of said second control voltage for providing adjustable control of said field energization while said armature voltage is maintained constant.

3. The invention defined in claim 2, wherein said means responsive to operation of the motor for providing a third control voltage comprises means responsive to the armature voltage of the motor for providing a third control voltage proportional to said armature voltage for comparison with said second control voltage to regulate said armature voltage.

4. The invention defined in claim 3, wherein said means responsive to operation of the motor for providing a third control voltage comprises means responsive to the speed of the motor for providing a third control voltage proportional to motor speed for comparison with said second control voltage, said first semi-conductor control means being responsive to said resultant voltage through a first range of magnitude thereof to control the armature voltage and said second semi-conductor control means being responsive to said resultant voltage through a second range of magnitude thereof to control field weakening.

5. In an adjustable voltage drive comprising a direct current motor having a shunt field winding energized from a controllable source of unidirectional voltage, an armature winding and controllable means for supplying adjustable voltage to said armature winding to control the speed of the motor, in combination, a source of unidirectional reference voltage, means for deriving a selectively adjustable output voltage from said reference voltage source, a timed reference network comprising substantially constant current passing semi-conductor means and an energy storage device responsive to said output voltage for providing a reference voltage which changes in magnitude linearly at a predetermined timed rate in response to change in magnitude of said output voltage, a cross-over network comprising first and second semi-conductor control means, armature control means comprising said first semi-conductor control means responsive to a first magnitude range of said linearly changing reference voltage for providing an amplified control voltage proportional thereto for controlling said controllable means thereby to control the magnitude of the voltage supplied to the motor armature to afford a linear change in motor speed in a first speed range while the field energization is maintained constant, and field control means comprising said second semi-conductor control means responsive to a second magnitude range of said linearly changing reference voltage for providing an amplified control voltage as a non-linear function thereof for controlling said controllable source thereby to control the amount of field winding energization in accordance with the inherent field current-speed characteristic to afford a further linear change in motor speed in a second speed range while the armature voltage is maintained constant.

6. The invention defined in claim 5, together with a voltage regulator for providing a regulating voltage proportional to the motor armature voltage, and wherein said armature control means comprises a semi-conductor control comparator network for comparing said regulating voltage and said reference voltage in said first magnitude range to provide a resultant voltage for controlling said controllable means thereby to regulate the motor armature voltage.

7. The invention defined in claim 5, together with a speed regulator for providing a feedback voltage proportional to the motor speed, and a semi-conductor control comparator network for comparing said reference voltage and said feedback voltage throughout said first and second magnitude ranges to provide a resultant voltage for controlling said armature control means in said first magnitude range and for controlling said field control means in said second magnitude range thereby to compensate for changes in motor speeds from preselected values.

8. In an adjustable voltage drive comprising a direct current motor having a shunt field winding energized from a controllable source of unidirectional voltage and an armature winding and controllable power supply means for supplying adjustable voltage to said armature winding to control the speed of the motor, in combination, a source of unidirectional voltage, means for deriving a selectively adjustable reference voltage from said unidirectional voltage source, a timed reference network responsive to said reference voltage for providing a speed reference voltage which changes in magnitude linearly at a predetermined adjustable timed rate in response to change in magnitude of said reference voltage, a cross-over network comprising an armature control circuit and a field control circuit, said armature control circuit comprising semi-conductor means responsive to said speed reference voltage in a first range of magnitude thereof up to a predetermined value for providing a first output voltage, amplifying means responsive to said first output voltage for energizing said controllable power supply means to control the speed of the motor in a first speed range, said field control circuit comprising semi-conductor means responsive to said speed reference voltage in a second range of magnitude thereof above said predetermined value for providing a second output voltage, and amplifying means responsive to said second output voltage for controlling said controllable source to control the speed of the motor in a second speed range.

9. The invention defined in claim 8, together with means responsive to the field winding current for providing a feedback voltage proportional thereto for comparison with said speed reference voltage in said second range of magnitude thereof to regulate the field winding energization.

10. The invention defined in claim 8, wherein said cross-over network further comprises first semi-conductor means effective in said first range of magnitude of said speed reference voltage for rendering said field control circuit ineffective to provide an output voltage, and second semi-conductor means effective in said second range of magnitude of said speed reference voltage for maintaining the output voltage of said armature control circuit constant, said first and second semi-conductor means being responsive to said predetermined value of speed reference voltage for effecting a transfer of adjustable output voltage control between said armature control circuit and said field control circuit.

11. In an adjustable voltage motor control system for a direct current motor having a shunt field winding and an armature winding, an alternating current source, first and second controllable power translating means each comprising a rectifying magnetic amplifier energized by said alternating current source for controlling full field winding energization and for controlling application of unidirectional voltage to said armature winding to effect operation of the motor, each said magnetic amplifier having a control winding energizable to control the output thereof, and means for controlling adjustment of the armature voltage while said field energization is maintained at full value to vary the motor speed through a first range and for thereafter controlling weakening of the field energization while said armature voltage is maintained at full value comprising a source of unidirectional voltage, a speed setter for selectively adjusting the output voltage of said unidirectional voltage source, a timed reference network for providing a reference voltage variable linearly at a timed rate in response to adjustment of said output voltage, and a cross-over network comprising an armature control voltage output portion and a field weakening control voltage output portion, said armature control voltage output portion comprising electronic means responsive to said reference voltage in a first variable range thereof up to a predetermined value for providing a first control voltage, means responsive to said first control voltage for controlling said control winding of second power translating means to control the armature voltage and the speed of the motor in a first speed range, said field weakening control voltage output portion comprising electronic means responsive to said reference voltage in a second variable range thereof above said predetermined value for providing a second control voltage, means responsive to said second control voltage for controlling said control winding of first power translating means to control weakening of the field energization and the speed of the motor in a higher speed range, and semi-conductor means responsive to said predetermined value of reference voltage for effecting a transfer of variable control voltage output between said portions of said cross-over network.

12. The invention defined in claim 11, wherein said second power translating means additionally comprises a direct current generator having a field winding subjected to controlled energization by the unidirectional output voltage of the associated magnetic amplifier and a driven armature winding for applying unidirectional voltage to the armature winding of the motor.

13. In an adjustable voltage control system for a direct current motor having a shunt field winding energized from a controllable source of unidirectional voltage, an armature winding and controllable means for applying adjustable voltage to said armature winding to control the speed of the motor, the improvement comprising an alternating current source, first means for controlling said controllable means to adjust the applied armature voltage, and second means for controlling said controllable source to weaken the field winding energization, said first control means comprising a modular rectifying power supply network, a modular timed reference voltage control network, a modular cross-over network and a modular power amplifier network, said second control means comprising the aforementioned power supply and timed reference and cross-over networks and an additional modular power amplifier network, each of said modular networks having input terminals and output terminals, the input terminals of said power supply network being connected to said alternating current source, a selectively adjustable speed setter connected between the output terminals of said power supply network and the input terminals of said timed reference network for adjusting the rectified input voltage to the latter, said timed reference network comprising electronic means for providing a controlled reference voltage which changes in magnitude linearly at predetermined timed rates in response to changes in magnitude of said input voltage, means for applying the output voltage of said timed reference network as an input voltage to said cross-over network, said cross-over network comprising an armature control voltage output portion and a field control voltage output portion, said armature control output portion comprising semi-conductor means responsive to a first range of magnitude of said linearly changing voltage for providing a first output voltage proportional thereto, said field control output portion comprising semi-conductor means responsive to a second range of magnitude of said linearly changing voltage for providing a second output voltage as a non-linear function thereof, means for connecting said first output voltage to the first mentioned power amplifier network, means connecting said first mentioned power amplifier network to said controllable means to control the motor armature voltage, means for connecting said second output voltage to said additional power amplifier network, and means connecting said additional power amplifier network to said controllable source to control weakening of the field winding energization.

14. In adjustable voltage drive comprising a direct current motor having a shunt field winding and an armature winding, in combination, first means for energizing said field winding to full value and controllable to weaken the field, second means controllable to supply adjustable voltage to said armature winding, means providing a source of constant but adjustable reference voltage, a timed reference network responsive to said reference voltage for providing a speed reference voltage which changes in magnitude linearly at a predetermined timed rate in response to change in magnitude of said reference voltage, a cross-over network comprising an armature control circuit and a field control circuit, said armature control circuit comprising means responsive to said speed reference voltage in a first range of magnitude thereof up to the predetermined value for providing a first output voltage proportional thereto, means responsive to said first output voltage for controlling said second means to control the speed of the motor in a first speed range, said field control circuit comprising semi-conductor control means responsive to said speed reference voltage in a second range of magnitude thereof above said predetermined value for providing a second output voltage which varies non-linearly substantially in accordance with the equation $$V\text{out} = KI_o - \frac{K}{K_2 \cdot V\text{in} - K_1}$$

wherein Vout is the second output voltage; Vin is proportional to the speed reference voltage; $K_1$ is proportional to the ratio of an increment of field flux to a corresponding increment of field current below the saturation point of the field; $K_2$ is proportional to the maximum field flux; $I_o$ is equal to the full field current; and K is a constant for changing current to voltage; and means responsive to said second output voltage for controlling said first means to vary the field energization non-linearly substantially in accordance with the inherent shunt field current-speed characteristic thereby to afford a linear adjustment in the motor speed in a second speed range.

References Cited in the file of this patent

UNITED STATES PATENTS

| | | |
|---|---|---|
| 2,546,799 | Thatcher | Mar. 27, 1951 |
| 2,847,632 | Harvey et al. | Aug. 12, 1958 |